Patented Feb. 8, 1949

2,460,925

UNITED STATES PATENT OFFICE 2,460,925

WHITE WRITING INK

William E. Decker, Melrose Highlands, Mass., assignor, by mesne assignments, to Technical Specialties Company, a corporation of Massachusetts No Drawing. Application September 6, 1946, Serial No. 695,287

6 Claims. (Cl. 106—26)

The present invention relates to an ink suitable for writing, lettering and marking, and is more particularly concerned with an ink of this character which is free from pigment particles but which is opaque and white in color when it has dried.

White inks for use in marking, writing, lettering, stencilling and the like, such, for example as inks used in writing classification numbers on library books, have heretofore been formed from white pigments, such as an inorganic mineral pigment, suspended or dispersed in an appropriate liquid vehicle. Aqueous dispersions of zinc oxide are commonly used for this purpose. Such inks have not proven entirely satisfactory. They settle rapidly, so that it is necessary to stir the ink or shake the ink bottle frequently during use, in some cases even between successive dips of the pen. Also, such inks are difficult to apply with a brush or pen, due primarily to the fact that liquids containing a sufficient amount of such inert insoluble pigments to give adequate tinctorial power do not flow properly from the pen nib or from the brush bristles.

The present invention has as an object to provide an ink suitable for use with a pen or brush and which is opaque and white in color when dry.

In accordance with the invention, I form a solution of a suitable cellulose ester in a volatile low-boiling solvent, or solvent mixture, together with a crystalline organic material which is soluble in the solvent, which has a melting point above ordinary atmospheric temperatures, and which will crystallize on and in the cellulose derivative during the drying of the ink.

In this specification and in the appended claims the word "solution" is intended to include dispersions.

The following example is given by way of illustration to disclose one manner in which an ink suitable for writing and marking purposes and which can be applied with a pen or a brush may be prepared in accordance with the invention:

3 oz. of cellulose nitrate are dissolved in 1 qt. of acetone. Solution is facilitated by first cutting or breaking the cellulose nitrate into small fragments. To the resulting solution is added 3 oz. of Du Pont synthetic gum camphor, 2 oz. of salicylic acid and 2 grams of a wetting agent, such as dibutyl sodium sulfosuccinate. The resulting transparent solution is a highly satisfactory writing fluid for use with pen or brush. It is quick drying, and opaque and white when dry.

The viscosity of the ink may be adjusted to suit particular requirements by varying the ratio of solvent to cellulose nitrate.

I have found that other cellulose esters, such as the lower alkanoyl cellulose esters, of which cellulose acetate and cellulose butyrate are examples, may be employed. In fact, I may use any cellulose ester which will form a film-forming solution with a volatile organic solvent having a boiling point less than about 75° C.

The solvent should be a volatile, low-boiling solvent, such as a ketone solvent, for example. Any solvent or solvent mixture, which is a common solvent for the cellulose ester, the crystalline organic material and the plasticizer, and which has a boiling point below about 75° C. will give good results.

The composition should include a crystalline organic compound which is soluble in the solvent, which does not react with the solvent, and which is capable of crystallizing at ordinary atmospheric temperatures as the solvent dries out of the applied film. Salicylic acid, methyl-p-amino-phenol, p-diacetyl hydroquinone, and benzoic acid are suitable materials for this component.

The relative amount of crystalline organic material may be varied considerably from the amount contained in the composition of the foregoing example. When salicylic acid is employed as the crystalline organic material, I have found that the maximum amount which can be used is about 16%, by weight on the entire composition, depending somewhat upon the solubility characteristics of the particular grade and type of nitrocellulose. Less than about 1 or 2% of salicylic acid is, in most compositions, of little significant effect. Generally, no greater amount of crystalline organic material should be used than will go readily and completely into solution in the solvent in the presence of the other ingredients.

The proportion of camphor, or other plasticizer, also may be varied. The most satisfactory proportion for any particular formulation can be determined readily by spreading a drop of the composition on a glass plate, observing its drying characteristics and adjusting the proportions as is indicated.

Preferably, I include in the composition a plasticizer which will render the dried ink film slightly flexible and prevent its cracking or crumbling when its support, such as a writing paper, is flexed. Natural gum camphor or synthetic camphor are particularly suitable for this purpose in compositions containing cellulose nitrate. Other compatible organic plasticizers well known in the art of cellulose ester technology may be used with the cellulose nitrate and with the cellulose alkyl esters. The presence of a wetting agent to lower the surface tension of the composition improves the flow and spreading characteristics of the ink when applied by a brush and causes it to flow more readily from the ordinary steel pointed pen.

The inks formed in accordance with the present invention are transparent and are highly stable on standing. They contain no insoluble solid pigment particles which, in ordinary inks, settle out and thereby require that the ink be stirred or shaken before it is used. Nevertheless, the ink of the present invention becomes white and highly opaque immediately upon drying, even when it is spread in a thin film. At the same time, the viscosity of the ink is sufficiently low to permit it to be applied with a pen or a brush with the same facility that ordinary colored inks are applied.

In offering the following theoretical explanation of the behaviour of my writing fluid, I understand that I am not to be limited thereby. I believe that the action of my ink in becoming white and opaque as soon as it dries, notwithstanding the absence therefrom of pigment particles, can be explained on the following basis: When the ink is spread into a thin film, as in writing or marking, the acetone or other solvent evaporates rapidly, due to its high vapor pressure at ordinary temperatures. This rapid evaporation causes enough cooling to condense sufficient moisture from the air to cause some of the cellulose fibers to be precipitated out of the solution. This action is somewhat analogous to that which occurs when lacquers blush. Then the crystalline organic material crystallizes out of the solution, due to the increase in its concentration following upon the loss of solvent. The crystalline material is thus intimately combined with, or attached to, or in the cellulose fibers.

The foregoing detailed disclosure of particular embodiments of my invention is made by way of illustration and not of limitation. Changes in the proportions of ingredients and in the kind and number of ingredients can be made by those skilled in the art without departure from the invention as expressed in the following claims.

I claim:

1. An ink adapted to become opaque and white when dry and suitable for application by pen or brush, consisting essentially of a solution in a volatile organic solvent of a cellulose ester and a soluble organic crystalline compound having a melting point above ordinary atmospheric temperatures and which is inert to the other ingredients.

2. An ink adapted to become opaque and white when spread in a thin film and suitable for application by pen or brush, consisting essentially of a solution in a volatile organic solvent of a cellulose ester, a compatible organic plasticizer, a soluble crystalline organic compound having a melting point above ordinary atmospheric temperatures and which is inert to the other ingredients, and a relatively small proportion of a wetting agent.

3. An ink adapted to become opaque and white when spread in a thin film and suitable for application by pen or brush, consisting essentially of a solution in a volatile organic solvent of cellulose nitrate, a plasticizer, a soluble crystalline organic compound having a melting point above ordinary atmospheric temperatures and which is inert to the other ingredients, and a relatively small proportion of a wetting agent.

4. An ink adapted to become opaque and white when spread in a thin film and suitable for application by pen or brush, consisting essentially of an acetone solution of cellulose nitrate containing camphor, a relatively small proportion of a wetting agent, and 1 to 16% of salicylic acid.

5. An ink adapted to become opaque and white when dried and suitable for application by pen or brush, consisting essentially of a solution in a volatile organic solvent of a cellulose lower alkanoyl ester and a soluble organic crystalline compound having a melting point above ordinary atmospheric temperatures and which is inert to the other ingredients.

6. An ink adapted to become opaque and white when dried and suitable for application with pen or brush, consisting essentially of a solution in a volatile organic solvent of cellulose nitrate and salicyclic acid, together with a wetting agent.

WILLIAM E. DECKER.

REFERENCES CITED

The following references are of record in the file of this patent:

UNITED STATES PATENTS

| Number | Name | Date |
|---|---|---|
| 738,533 | Eichengrun | Sept. 8, 1903 |
| 1,102,638 | Adom | Oct. 24, 1916 |
| 2,028,091 | Jaeger | Jan. 14, 1936 |
| 2,176,423 | Jaeger | Oct. 17, 1939 |

FOREIGN PATENTS

| Number | Country | Date |
|---|---|---|
| 145,106 | Germany | Oct. 26, 1903 |

OTHER REFERENCES

"The Applications of Nitrocellulose Emulsions to Paper," Hercules Powder Company, Wilmington, Del., 1936, pages 3 to 9.

"Printing Ink," Ellis, 1940, pages 407, 353, 114, 113.

"Handbook of Material Trade Names," Zimmerman et al. (1946), pages 11 and 12.